(12) United States Patent
Makikawa et al.

(10) Patent No.: US 6,615,614 B1
(45) Date of Patent: Sep. 9, 2003

(54) METHOD FOR PREPARING OPTICAL WAVEGUIDE SUBSTRATE

(75) Inventors: Shinji Makikawa, Annaka (JP); Shigeru Konishi, Annaka (JP); Seiki Ejima, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/610,952

(22) Filed: Jul. 6, 2000

(30) Foreign Application Priority Data

Jul. 7, 1999  (JP) .......................... 11-193593

(51) Int. Cl.$^7$ ............................. C03B 19/14
(52) U.S. Cl. ............. 65/386; 65/429; 65/413; 65/430
(58) Field of Search ............ 65/386, 429, 413, 65/430

(56) References Cited

U.S. PATENT DOCUMENTS 5,961,683 A * 10/1999 Mizuta et al. ............... 65/386
6,112,002 A *  8/2000 Tabuchi ....................... 385/124

FOREIGN PATENT DOCUMENTS

| EP | 0 401 845 | 12/1990 |
| EP | 0 735 006 | 10/1996 |
| GB | 21112956 | * 7/1983 |
| JP | 53-70839 | * 6/1978 |
| JP | 56 042204 | 4/1981 |
| JP | 60-156014 | * 8/1985 |
| JP | 2-102139 | 4/1990 |
| JP | 10 197737 | 7/1998 |

OTHER PUBLICATIONS

JPO English Abstract of JP 56–042204, Apr. 1981.*

* cited by examiner

Primary Examiner—John Hoffmann
(74) Attorney, Agent, or Firm—Millen, White, Zelano & Branigan, P.C.

(57) ABSTRACT

An optical waveguide substrate is prepared by forming grooves in a silicon substrate in accordance with the pattern of a desired waveguide device, thermally oxidizing the silicon substrate to form a peripheral quartz layer surrounding the grooves, burying in the grooves a doped quartz glass layer having a higher refractive index, abrading the surface of the resulting structure to be flat, and forming on the flat surface a glass layer having a lower refractive index. An optical waveguide substrate featuring no distortion of the core pattern, little warp, and a low loss can be produced in a simple manner.

14 Claims, 3 Drawing Sheets

(a)

(b)

(c)

(d)

(e)

(a)

(b)

(c)

(d)

(e)

(f)

METHOD FOR PREPARING OPTICAL WAVEGUIDE SUBSTRATE

Method for Preparing Optical Waveguide Substrate This invention relates to a method for preparing an optical waveguide substrate having transparent quartz films on the surface and in the interior, exhibiting improved electrical insulation and optical propagation, and suited for use in optical waveguide devices for optical communication.

BACKGROUND OF THE INVENTION

Quartz substrates and silicon substrates are common substrates for use in optical waveguide devices for optical communication. The silicon substrates are typically used in the manufacture of semiconductor integrated circuits and characterized by a good heat conductivity and surface amenability to a variety of processes including etching, oxidation and deposition. They are available in large size and at a low cost.

In one prior art known method for preparing a waveguide device, a glass film, known as under clad film, is formed on a silicon substrate to a thickness of about 10 to 30 $\mu$m by a flame deposition technique. In addition to the deposition of a glass film on a silicon substrate, there is also known a thermal oxidation method of directly oxidizing a silicon substrate to form a glass film.

Referring to FIG. 2, the process of preparing an optical waveguide circuit by the flame deposition technique is described. An under clad layer 2 is first formed on a substrate 1, and a core film 4 is formed thereon. The core film 4 is processed to define a waveguide pattern of protrusions 5, which is designated a core pattern. Thereafter, an upper clad glass film 6 is formed thereon. This process produces a buried optical waveguide. This process is herein designated protrusion process.

Another process of preparing a similar buried waveguide pattern is disclosed in JP-A 10-197737. Referring to FIG. 3, an under clad layer 2 is formed on a substrate 2, then processed in accordance with a waveguide pattern to define a recess 3. A core film 4 is formed thereon. The core layer 4 is then abraded off until the upper surface of the clad layer 2 is exposed, leaving a core segment 5 as shown in FIG. 3(e). A glass film 6 serving as an upper clad layer is then formed to produce a buried optical waveguide. This process is herein designated depression process.

The depression process has advantages over the protrusion process. Since the optical circuit pattern is formed as recesses by etching, the depression process eliminates thinning of the core pattern during etching which can occur in the protrusion process. Since the core is buried in the under clad during formation of the upper clad, the upper clad applies less stresses to the core than in the protrusion process.

For the formation of the under clad in the depression process, a flame deposition technique is used to deposit a glass film of about 30 $\mu$m thick. Due to differential thermal expansion between glass and the substrate, a warpage of about 200 $\mu$m can occur on the glass side when the substrate has a diameter of 4 inches. Thereafter, the glass film in warped state is etched to define recesses in accordance with the core pattern. A core film of about 8 $\mu$m thick is deposited and vitrified on the etched surface. The core film is abraded from its upper surface until the core film is separated into segments buried in the recesses. In this process, the formation of the core pattern on the substrate in warped state is followed by the abrasion of the core film. Unless a suitable countermeasure is taken for correcting the warp, uniform etching and abrasion of the entire wafer is impossible. One common approach is to vacuum chuck the wafer on the back side, but fails to correct the entire wafer for complete uniformity. The vacuum chuck requires to-abrade wafers one by one, which is industrially inadequate.

SUMMARY OF THE INVENTION

An object of the invention is to provide a simple method for effectively preparing an optical waveguide substrate featuring a low loss.

The invention provides a method for preparing an optical waveguide substrate, comprising the steps of:

forming concave grooves in one surface of a silicon substrate in accordance with the pattern of a desired waveguide device, thermally oxidizing the silicon substrate to form a peripheral quartz layer surrounding the grooves, burying in the grooves a doped quartz glass layer having a higher refractive index than the peripheral quartz layer, abrading the surface of the resulting structure to be flat to define higher refractive index quartz glass layer segments in the grooves, and forming on the flat surface a glass layer having a lower refractive index than the quartz glass layer, wherein light propagates through the higher refractive index quartz glass layer segments buried in the grooves.

Using thermal oxidation in combination with a recessed substrate, the invention has succeeded in fabricating an optical waveguide substrate in which the under clad layer and the core layer are alternately arranged on the same surface of the substrate. The core pattern is not deformed since the core is flanked with the thermally oxidized layer. Also the thermally oxidized layer is a pure quartz layer which minimizes an insertion loss.

The substrate having alternate under clad and core undergoes minimized warp because the under clad layer is formed by thermal oxidation. This facilitates the abrasion step.

DESCRIPTION OF THE PREFERRED EMBODIMENT

Figure 1:
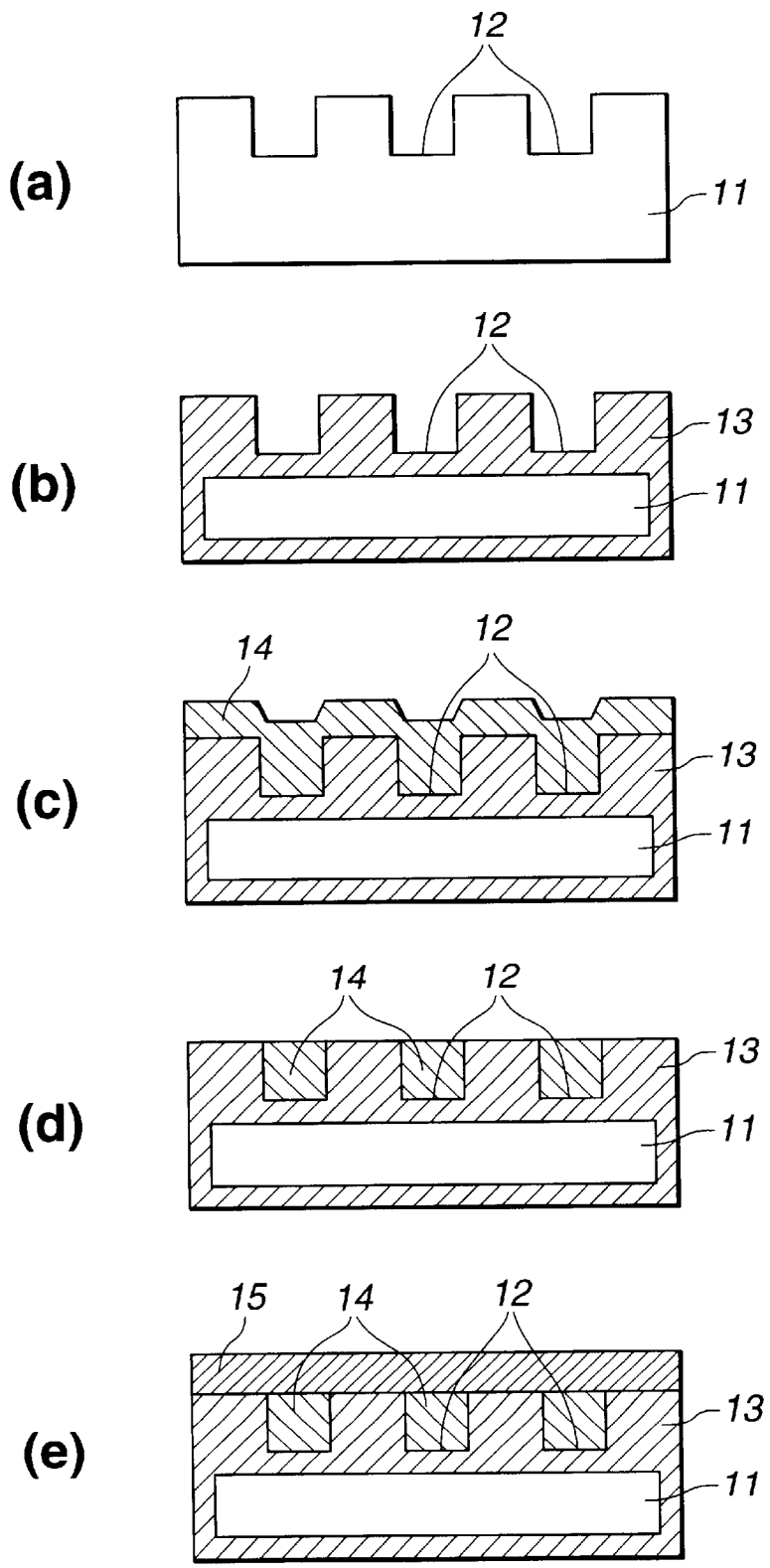
FIG. 1 illustrates a series of steps for preparing an optical waveguide substrate according to the invention.
Figure 2:
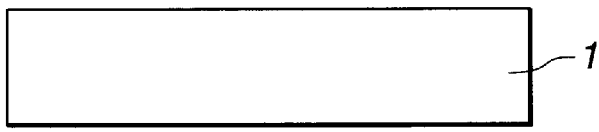
FIG. 2 illustrates a series of steps of a prior art method for preparing an optical waveguide substrate.
Figure 2:
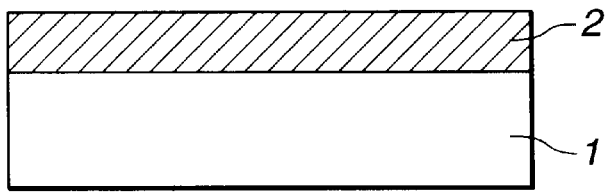
Figure 2:
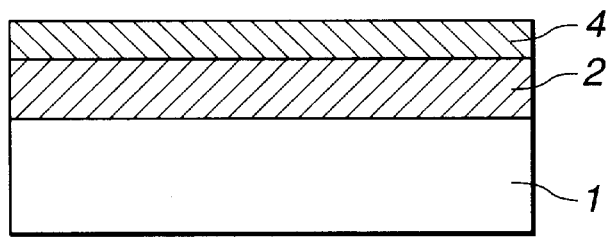
Figure 2:
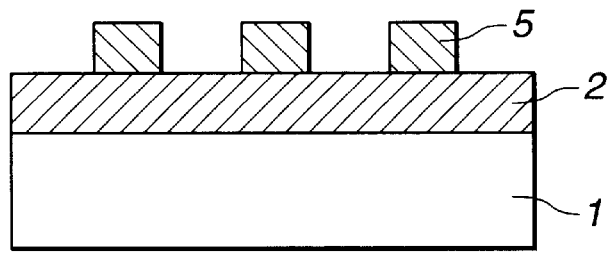
Figure 2:
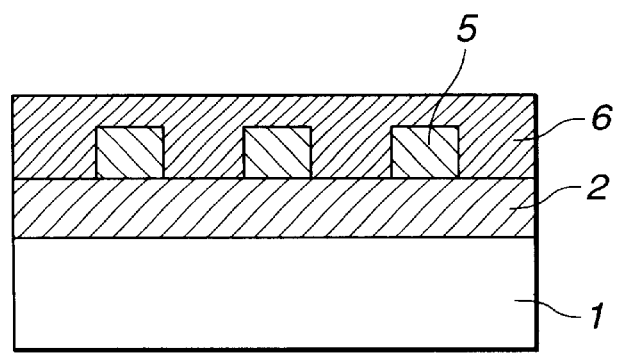
Figure 3:
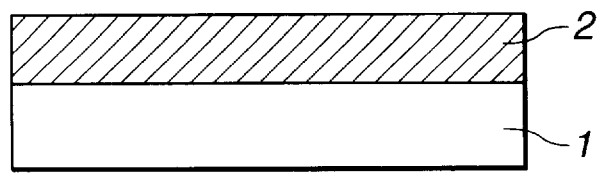
FIG. 3 illustrates a series of steps of another prior art method for preparing an optical waveguide substrate.
Figure 3:
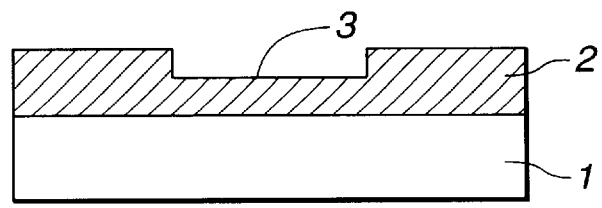
Figure 3:
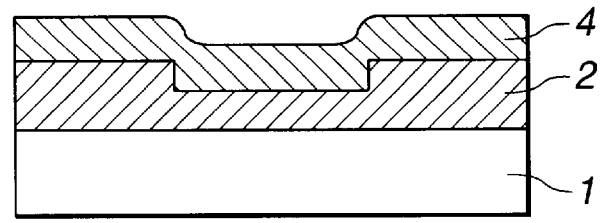
Figure 3:
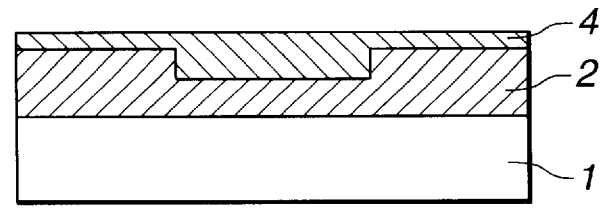
Figure 3:
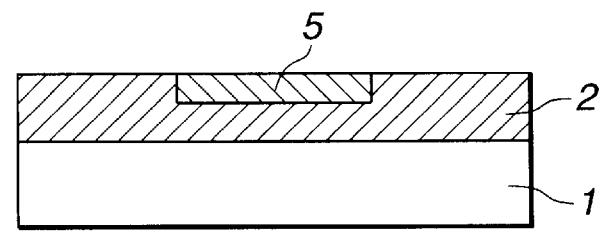
Figure 3:
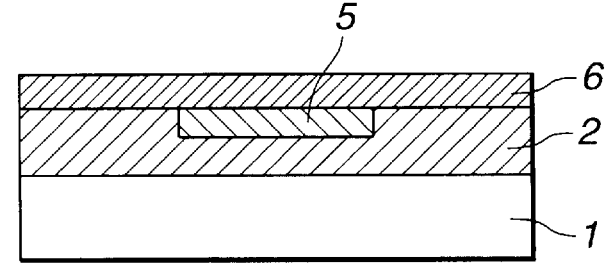

Referring to FIG. 1, the method for preparing an optical waveguide substrate according to the invention is described. There is furnished a silicon substrate having a pair of opposed flat surfaces. As shown in FIG. 1(a), a first step is to form concave grooves 12 in one surface of the silicon substrate 11 in accordance with a pattern corresponding to the desired core pattern. This step can be effected by photolithography and etching. Dry etching is the typical etching. The spacing between the concave grooves 12 (the spacing between core segments) is preferably 20 $\mu$m or less.

Then the recessed substrate is heat treated in an oxidizing atmosphere whereby the substrate surface is oxidized preferably to a depth of about 10 to 30 $\mu$m as depicted at 13 in FIG. 1(b). This oxidation may be conducted in any of a steam atmosphere, dry oxygen atmosphere, halogen oxidizing atmosphere and nitrogen oxide atmosphere. Desirably, the atmosphere is pressurized to accelerate the rate of oxidation.

As a result of oxidation, the substrate is expanded in volume by about 50%. When the concave groove pattern is initially formed, the pattern must be set somewhat larger than the core pattern with the increment of expansion foreseen. Although the side surfaces of the concave grooves are somewhat rough due to reactive ion etching, some flow occurs during subsequent thermal oxidation so that the side surfaces become flattened at the end of thermal oxidation.

The recessed substrate as oxidized corresponds to a substrate having a so-called under clad film formed thereon. At this point, the substrate has been oxidized over its entirety including the back surface, which prevents any warp caused by differential thermal expansion between the oxide film and the substrate.

Next, as shown in FIG. 1(c), a quartz core film 14 which is doped with an impurity such as $GeO_2$ or $TiO_2$ so as to have a somewhat higher refractive index is deposited so as to fill the concave grooves 12 therewith. The core film is also thinly deposited on areas other than the grooves, that is, on the surface of the substrate in order to accommodate the volume shrinkage during vitrification.

The under clad film used herein is a pure quartz film since it is formed by oxidation of the silicon substrate. This eliminates any concern about the vitrifying temperature of the under clad film when the core film is deposited as mentioned above. No problem arises at a vitrifying temperature of about 1,300° C. There is no risk that the shape of the concave grooves is deformed during vitrification.

Next, as shown in FIG. 1(d), the surface of the resulting structure is abraded off until the substrate is exposed and a flat surface is defined. At this point, the warpage of the substrate is caused only by the core and is as little as about 20 $\mu$m because there is no warp of the under clad layer. Accordingly, abrasion can be conducted by a conventional grinding machine capable of mounting a number of substrates at a time. Chemical mechanical polishing (CMP) is also acceptable. Abrasion is preferably continued until the buried portions of the core film are abraded several microns. This results in the substrate in which the core film segments 14 and the under clad film 13 are present on the same substrate surface.

Finally, as shown in FIG. 1(e), an over clad film 15 is formed on the substrate, for example, to a thickness of about 20 $\mu$m. Since the over clad film is formed on the flat surface, no attention need be paid to the filling of interstices in the core circuit pattern. This allows for the use of low-temperature techniques known to have a poor filling capability such as evaporation, ion plating, and plasma chemical vapor deposition as well as the flame deposition technique which is usually employed.

By processing grooves in a silicon substrate in accordance with the core pattern, forming an under clad film by thermal oxidation, forming a core film in the grooves, and flattening the structure, there can be fabricated a buried waveguide substrate in which the under clad film and the core film are on the same substrate surface. This enables the manufacture of an optical circuit part featuring no deformation of the core pattern and little warp, accomplishing a low loss.

EXAMPLE

Examples of the invention are given below by way of illustration and not by way of limitation.

In line with the process illustrated in FIG. 1, a pattern corresponding to a desired core pattern was formed on a silicon substrate by photolithography and reactive dry etching. The width and depth of concave grooves were set with a volume increment of 50% by oxidative expansion incorporated therein. More specifically, when it was desired to obtain concave grooves of 8 $\mu$m wide and 15 $\mu$m deep, the width and depth of concave grooves were set at 12 $\mu$m and 23 $\mu$m, respectively, in the etching step. Next, the recessed substrate was oxidized at 1,000° C. in high pressure steam under 0.5 MPa for about 120 hours. Volume expansion took place at this point whereby the concave grooves were constricted to a width of 8 $\mu$m and a depth of 15 $\mu$m. If the spacing between adjacent concave grooves is less than 15 $\mu$m, the oxide films on two adjacent groove side surfaces become contiguous, which eliminates any problem when the invention is applied to a circuit for optical coupling.

Next, by a flame deposition technique, core glass soot is deposited so as to fill the concave grooves therewith. The structure was held in an electric furnace at 1,300° C. for 2 hours, obtaining a core layer. $GeO_2$ or $TiO_2$ was added to the soot so that the core layer might have a relative index of about 0.3 to 1.5%.

Next, the glass film on the substrate surface was abraded off by reactive ion etching or chemical mechanical polishing (commonly employed in semiconductor processes) until both the core layer and the clad layer appeared on the same substrate surface. The substrate before abrasion had a warpage of about 5 $\mu$m which was extremely small as compared with the core film-bearing substrate prepared by a conventional flame deposition technique having a warpage of 200 $\mu$m.

Finally, by a flame deposition technique, glass soot was deposited on the substrate. The structure was held in an electric furnace at 1,250° C. for 2 hours, obtaining an over clad layer. $B_2O_3$ or $P_2O_5$ was added to the soot so that the over clad layer might have a lower refractive index than the core layer.

The buried waveguide substrate thus obtained bore the core pattern without distortion and had minimized warp.

Note that the over clad layer is a planar layer, it can also be formed by plasma chemical vapor deposition. With the substrate grounded and a high frequency of 13.56 MHz applied, tetraethoxysilane carried by argon was passed from the positive electrode side at a vacuum of not higher than 1 Pa. After 2 hours, a glass film of 20 $\mu$m thick was formed on the substrate. After the glass film was formed, it was annealed at a temperature of 1,000° C. or higher. An equivalent buried waveguide substrate was obtained.

According to the invention, an optical waveguide substrate featuring no distortion of the core pattern, little warp, and a low loss can be produced in a simple manner.

Japanese Patent Application No. 11-193593 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A method for preparing an optical waveguide substrate, comprising the steps of:

forming concave grooves in one surface of a silicon substrate in accordance with the pattern of a desired waveguide device, thermally oxidizing the silicon substrate to form a peripheral, quartz layer surrounding the grooves, burying in the grooves a doped quartz glass layer having a higher refractive index than the peripheral quartz layer, abrading the surface of the resulting structure to be a flat to define higher refractive index quartz glass layer segments in the grooves, and forming on the flat surface a glass layer having a lower refractive index than the quartz glass layer, wherein light propagates through the higher refractive index quartz glass layer segments buried in the grooves.

2. The method of claim 1, wherein the concave grooves are formed by photolithography and etching.

3. The method of claim 2, wherein the etching is by dry etching.

4. The method of claim 2, wherein the finished optical waveguide substrate has higher refractive index quartz glass layer segments in the grooves which are spaced apart 20 µm or less.

5. The method of claim 1, wherein the thermal oxidizing of the silicon substrate is conducted in an atmosphere of steam, dry oxygen, halogen or nitrogen oxide.

6. The method of claim 5, wherein the atmosphere is a pressurized atmosphere.

7. The method of claim 1, wherein the doped quartz glass layer having a higher refractive index than the peripheral quartz layer is doped with $GeO_2$ or $TiO_2$.

8. The method of claim 1, wherein doped quartz glass layer having a higher refractive index than the peripheral quartz layer is formed by flame deposition.

9. The method of claim 1, wherein the glass layer having a lower refractive index than the quartz glass layer is formed on the flat surface to a thickness of about 20 µm.

10. The method of claim 1, wherein the glass layer having a lower refractive index than the quartz glass layer is formed on the flat surface by evaporation, ion plating or plasma chemical vapor deposition.

11. The method of claim 1, wherein the glass layer having a lower refractive index than the quartz glass layer is formed on the flat surface by flame deposition.

12. The method of claim 1, wherein the glass layer having a lower refractive index than the quartz glass layer contains $B_2O_3$ or $P_2O_5$ to give it the lower refractive index.

13. The method of claim 1, wherein the abrading is by conventional grinding machine, chemical mechanical polishing or by reactive ion etching.

14. The method of claim 1, wherein the abrading is by conventional grinding machine or chemical mechanical polishing.

* * * * *